Dec. 8, 1964    J. A. DE JULIO ETAL    3,160,014
PRESSURE TRANSDUCER
Filed Aug. 7, 1961

INVENTORS
JAMES A. DE JULIO
ROBERT R. MAWSON
BY Warren T. Jessup
ATTORNEY

United States Patent Office 3,160,014
Patented Dec. 8, 1964

3,160,014
PRESSURE TRANSDUCER
James A. De Julio, Pontiac, Mich., and Robert R. Mawson, Cambridge, Mass., assignors to Servonic Instruments, Inc., Costa Mesa, Calif., a corporation of California
Filed Aug. 7, 1961, Ser. No. 129,733
4 Claims. (Cl. 73—398)

The present invention relates generally to transducers, and it relates more particularly to a pressure responsive instrument assembly for converting pressure variations into corresponding electrical signals.

The assembly of the present invention is particularly useful in airborne vehicles, and it serves as a convenient means for translating pressure readings in the vehicle into electric signals which can be transmitted from one point to another in the vehicle, or from the vehicle to a remote station, for indication or control purposes.

The assembly of the present invention is an improvement over the usual prior art type of pressure responsive instrument. The usual prior art instrument includes, for example, a potentiometer having an associated slider or wiper arm. The slider of the potentiometer is affixed to the movable end of a Bourdon tube. Then, as the movable end of the Bourdon tube moves in response to pressure variations, the potentiometer slider shifts with respect to the potentiometer so that an electric signal variation can be generated.

Problems are encountered in most prior art instruments of the above general type. These problems include, for example, the provision of a suitable instrument capable of exhibiting linear variations in the resistance of the potentiometer for linear variations in pressure, and of achieving this without unduly complicating the instrument, or rendering it unduly delicate or bulky.

It is, accordingly, an object of the present invention to provide an improved simple, rugged and compact pressure-responsive transducer which is capable of exhibiting precise linear characteristics and which is not subject to the drawbacks and disadvantages of the prior art assemblies of this general type.

Another important object of the present invention is to provide such an improved instrument which is unresponsive to extraneous vibrations for all practical purposes, and in which spurious electrical response due to such vibrations is eliminated.

The last mentioned objective is realized in a manner to be described by a construction which enables the masses of all moving parts of the instrument to be reduced to a minimum and the stiffness of the moving parts to be increased to an optimum. This renders the instrument of the invention virtually insensitive to usual extraneous vibrations, which vibrations normally lie below 2,000 cycles per second.

The features of the invention which are believed to be new are set forth with particularity in the claims. The invention itself, however, together with further objects and advantages thereof, may best be understood by reference to the following description, when taken in conjunction with the accompanying drawing.

The accompanying drawing shows various views of an instrument constructed in accordance with one embodiment of the invention, these views being illustrated on an enlarged scale, of the order of 4:1, and in which.

Figure 1:
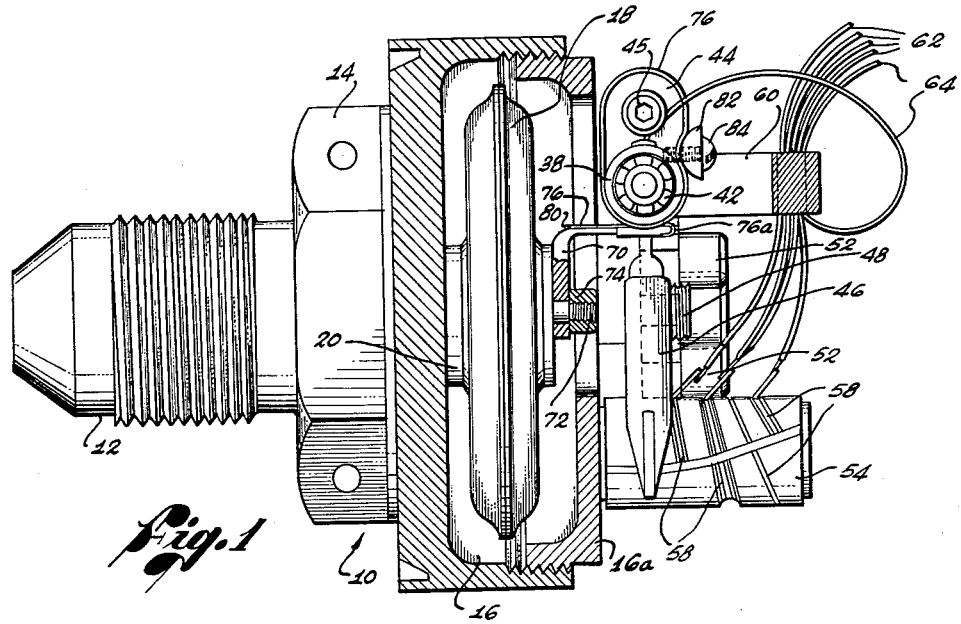
FIGURE 1 is a side view, partly in section, of one embodiment of the invention.

Referring now to the drawings, the transducer instrument illustrated therein includes a fitting and bellows assembly 10. The fitting portion of the assembly 10 includes a tubular male coupling member 12 which is externally threaded and which has a hexagonal head, for example. The fitting and bellows assembly also includes a cylindrical shaped housing which may be formed integral with the head 14.

The bellows portion of the assembly 10 includes a standard single cell bellows capsule 18 which is mounted within the housing 16. The capsule 18 is so mounted, as is usual practice in the mounting of pressure bellows, so that one of its walls is affixed to the end of a tube 20. The tube 20 is rigidly mounted within the housing 16 and communicates with the tubular coupling member 12 and with the interior of the capsule 18. The arrangement is such that the right hand wall of the capsule 18 in FIGURE 1 moves back and forth in a rectilinear reciprocal manner in response to pressure variations in the pressure line, or other pressure source, into which the coupling member 12 is fitted.

An apertured cover plate 16a is threaded into the housing 16 and spot welded in place. A supporting bracket 22 is mounted on the cover plate 16a by means of screws 24. As shaft-supporting portion 26 is formed integral with the bracket 22, and a guide screw 28 is threaded therethrough. A second shaft-supporting portion 34 is formed integral with the bracket 22 in axial alignment with the shaft-supporting portion 26. A guide screw 36 is threaded through the portion 34.

A shaft, or hub, 38 is rotatably mounted on the screws 28 and 36 by means of a pair of bearings 40 and 42. The hub 38 is freely rotatable. A counterweight 44 is formed integral with the hub 38 and extends radially outwardly from the hub. A screw 45 extends into the counterweight.

Figure 2:
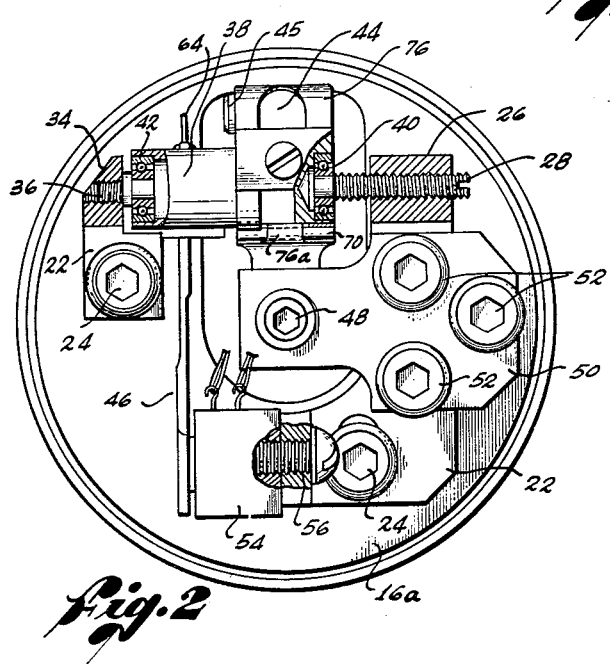
FIGURE 2 is an end view of the assembly of FIGURE 1, taken from the right hand end of FIGURE 1, this latter view also being partly in section.
Figure 3:
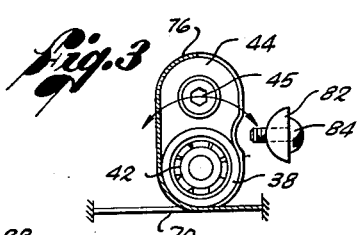
FIGURE 3 is a fragmentary view showing certain ones of the components of the assembly of FIGURE 1 on an exploded basis.

A wiper arm 46 is also attached to the hub 38. The wiper arm extends radially from the hub in diametrical relationship with the counterweight 44, but spaced axially along the hub from the counterweight, as shown in FIGURE 2.

The free end of the wiper arm 46 describes an arc as the hub 38 rotates. The arcuate motion of the arm 46 to the right in FIGURE 1 is limited by a set screw 48, the set screw being threaded through a support member 50 which is mounted on the plate 16a by screws 52. The free end of the wiper arm 46 moves across the receptor 54, the receptor being mounted on the supporting bracket 22 by a pair of screws, such as the screw 56. These screws have a slotted engagement with the support bracket so as to permit a slight radial tilting adjustment for the receptor 54, or its equivalent, to adjust the linearity ratio of the instrument.

The receptor 54 in the illustrated embodiment is a commutator type of electrical element, and it includes a plurality of electrically conductive commutator segments 58. The support bracket 22 also has an integral portion 60 which serves to support a plurality of leads 62 which are connected to respective ones of the commutator segments 58. A lead 64 is connected to the wiper arm 46 to complete the electric circuit. Pressure variations in the line, or other pressure source to which the coupling member 12 is fitted, are reflected by the selective contact of the wiper 46 with the different commutator segments 58. It is evident that the illustrated commutator type receptor 54 may be replaced by a continuous potentiometer resistor, or other type of electrical element, if so desired.

The movable right hand wall in FIGURE 1 of the capsule 18 has an angle bracket 70 affixed thereto. This bracket is preferably formed of a material having a low coefficient of expansion, such as Invar. The bracket 70 is held on a centrally located stud 72 on the wall of the capsule by a nut 74, the nut being preferably spot welded in place. The bracket 70 extends through the aperture in the plate 16a and passes directly under the rotatable hub 38 in tangential relationship with the hub.

Figure 4:
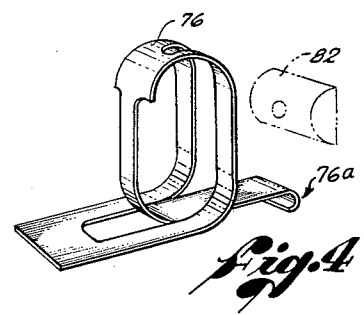
FIGURE 4 is a perspective view of a drive band which is incorporated in the assembly of FIGURE 1.

The bracket 70 is coupled to the hub 38 by means of a resilient drive band, or strap, 76. The configuration of the band 76 is best shown in FIGURE 4, and it is of the type described in copending application Serial No. 51,204 filed August 22, 1960. The drive band 76 extends around the hub 38 and up and around the counterweight 44. The right hand end 76a of the band, in FIGURES 1 and 4, is curled down over the end of the bracket 70 and welded thereto. The left hand end of the band 76 is welded at 80 (FIGURE 1) to the bracket 70.

The drive band 76 serves as the sole coupling between the bracket 70 and the hub 38, and the coupling is entirely frictional. The band 76 is securely clamped around the hub 38 by means of a semi-cylindrical shaped member 82. The member 82 serves to force the drive band into a concave depression in the counterweight 44. The member 82 is held in place by a screw 84 which extends through the member 82 and through a longitudinal slot in the drive band 76. The screw 84 is threaded into the counterweight 44. As best shown in FIGURE 4, one end of the band 76 has a reduced width, and this end extends through the slot to complete the desired looped configuration.

A simple initial adjustment between the position of the angle bracket 70 and the wiper arm 46 can be made merely by loosening the screw 84 and moving the two members 70 and 46 with respect to one another. The screw 84 can then be re-tightened. This repositions the drive band 76 firmly and tightly around the hub 38, and the drive band is firmly clamped around the hub and counterweight by the member 82 and the screw 84.

The invention provides, therefore, an improved instrument, the construction of which permits the various components to be supported in a rigid, compact and rugged assembly. Moreover, the above described construction of the illustrated embodiment of the invention permits the various movable components to have a minimum mass and a maximum stiffness. These latter characteristics, as described above, render the improved instrument of the invention virtually insensitive to external vibrations extending through the normal frequency range.

What is claimed is:

1. An instrument for indicating pressure variations and for converting the same into electrical signals, said instrument including in combination: a support means, a pressure responsive element mounted on said support means and having a portion reciprocally and rectilinearly movable in accordance with the pressure variations to be indicated, a shaft-like member rotatably mounted on said support means in spaced relationship with said portion of said pressure responsive element, an electrical element mounted on said support means, a wiper arm for said electrical element mounted on said shaft-like member and extending radially therefrom into electrical engagement with said electrical element for arcuate motion with respect thereto upon rotation of said shaft-like member, a counterweight member for said wiper arm mounted on said shaft-like member, a bracket means mounted on said portion of said pressure responsive element for linear reciprocal movement upon movements of said portion, said bracket means having a free end extending into essentially tangential relationship with said shaft-like member, and a resilient drive band having its ends secured to said bracket means and extending with a looped configuration around said counter-weight member and around said shaft-like member in clamped relationship therewith for coupling said bracket means to said shaft-like member so as to translate rectilinear movements of said portion of said pressure responsive element into corresponding rotational movements of said shaft-like member.

2. The instrument defined in claim 1 in which said drive band has a longitudinal slot therein and in which at least one of said members has a depression formed therein, and which includes a clamping means and a thread screw means for said clamping means extending therethrough and through the slot in said drive band into threaded engagement with at least one of said members, so that adjustment of said screw means causes said clamping means to clamp said drive band into said depression for controlling the engagement of said drive band with said members.

3. The instrument defined in claim 2 and in which said depression and said clamping means have a cylindrical surface configuration.

4. In an instrument of the type described, the combination of:

responsive means having at least one portion reciprocally and rectilinearly movable in accordance with variations to be indicated by the instrument;

a shaft-like member rotatably mounted in the instrument; a drive band coupled to said portion of said responsive means and extending with a looped configuration around said shaft-like member for coupling said portion to said shaft-like member so as to translate reciprocal rectilinear movements of said portion of said responsive means into corresponding rotational movements of said shaft-like member; and clamping means mounted on said shaft-like member and overlying said band to clamp said band against the surface of said shaft-like member.

References Cited by the Examiner

UNITED STATES PATENTS 2,778,986   1/57   Eklund _____ 73—398 X

FOREIGN PATENTS 702,636   1/54   Great Britain.

RICHARD C. QUEISSER, *Primary Examiner.*

JOSEPH P. STRIZAK, *Examiner.*